(12) United States Patent
Porras et al.

(10) Patent No.: US 9,827,846 B2
(45) Date of Patent: Nov. 28, 2017

(54) TRACTION BATTERY COOLING SYSTEM (71) Applicant: Ford Global Technologies, LLC, Dearborn, MI (US)

(72) Inventors: Angel Fernando Porras, Dearborn, MI (US); Mark G. Smith, Canton, MI (US); Timothy Noah Blatchley, Dearborn, MI (US); Kenneth J. Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 14/735,658

(22) Filed: Jun. 10, 2015

(65) Prior Publication Data

US 2016/0361990 A1  Dec. 15, 2016

(51) Int. Cl.
| | |
|---|---|
| *B60K 11/08* | (2006.01) |
| *B60K 11/04* | (2006.01) |
| *B60K 6/48* | (2007.10) |
| *B60L 11/18* | (2006.01) |
| *B60L 1/02* | (2006.01) |
| *B60K 1/00* | (2006.01) |

(52) U.S. Cl.
CPC .............. *B60K 11/085* (2013.01); *B60K 6/48* (2013.01); *B60K 11/04* (2013.01); *B60L 1/02* (2013.01); *B60L 11/1816* (2013.01); *B60L 11/1874* (2013.01); *B60K 2001/005* (2013.01); *B60L 2240/545* (2013.01); *B60L 2240/662* (2013.01); *Y02T 10/6221* (2013.01)

(58) Field of Classification Search
CPC ............ B60K 11/085; B60K 2001/005; B60H 1/00278; B60L 11/1874; F01P 7/10; F01P 2050/24; F01P 2025/13; F01P 2025/66; H01M 10/625
See application file for complete search history.

(56) References Cited

U.S. PATENT DOCUMENTS

| | | | | |
|---|---|---|---|---|
| 6,481,230 | B2 | 11/2002 | Kimishima et al. | |
| 7,147,071 | B2* | 12/2006 | Gering | B60H 1/00278 165/164 |
| 7,621,142 | B2* | 11/2009 | Hoshi | B60H 1/004 165/140 |
| 8,311,708 | B2* | 11/2012 | Kerns | F01P 7/10 701/101 |
| 8,667,931 | B2* | 3/2014 | Kerns | F01P 7/10 123/41.05 |
| 9,050,885 | B1* | 6/2015 | Dudar | B60W 20/00 |
| 9,312,549 | B2* | 4/2016 | Tachibana | B60K 11/06 |
| 2005/0257563 | A1 | 11/2005 | Hoshi et al. | |

(Continued)

*Primary Examiner* — Hau V Phan
(74) *Attorney, Agent, or Firm* — David Kelley; Brooks Kushman, P.C.

(57) ABSTRACT

A vehicle includes a traction battery and a cooling system. The cooling system has a chiller, a radiator, and conduit and valving arranged to form a thermal circuit configured to selectively transport heat via coolant from the traction battery to the radiator. The vehicle also includes a grille shutter assembly having an opening and shutters movable to alter an effective cross-sectional area of the opening. A controller is programed to operate the shutters to change the effective cross-sectional area of the opening to increase or decrease air flow over the radiator based on a temperature of the coolant and an ambient air temperature.

11 Claims, 6 Drawing Sheets (56) References Cited

U.S. PATENT DOCUMENTS

| | | | |
|---|---|---|---|
| 2005/0279113 A1* | 12/2005 | Hoshi | B60H 1/004 62/239 |
| 2006/0095178 A1* | 5/2006 | Guilfoyle | B60K 11/085 701/36 |
| 2012/0085510 A1 | 4/2012 | Kim et al. | |
| 2014/0338376 A1* | 11/2014 | Carpenter | B60L 1/003 62/115 |
| 2014/0374081 A1* | 12/2014 | Kakehashi | B60K 11/02 165/202 |
| 2015/0149043 A1* | 5/2015 | Macfarlane | B60K 11/085 701/49 |
| 2015/0165896 A1* | 6/2015 | Nam | B60K 11/04 701/49 |
| 2015/0273976 A1* | 10/2015 | Enomoto | B60K 6/22 165/202 |
| 2015/0367723 A1* | 12/2015 | Itoh | B60K 11/085 701/22 |

* cited by examiner

TRACTION BATTERY COOLING SYSTEM

TECHNICAL FIELD

The present disclosure relates to thermal management systems for traction battery assemblies of motor vehicles.

BACKGROUND

The need to reduce fuel consumption and emissions in automobiles and other vehicles is well known. Vehicles are being developed that reduce reliance or completely eliminate reliance on internal combustion engines. Electrified vehicles are one type of vehicle currently being developed for this purpose. In general, electrified vehicles differ from conventional motor vehicles in that they are selectively driven by one or more battery powered electric machines. Many electrified vehicles include thermal management systems that mange the thermal demands of various components during vehicle operation, including the vehicle's high-voltage traction battery. Some thermal management systems provide active heating or active cooling of the battery pack as part of a liquid cooled system.

SUMMARY

According to one embodiment, a vehicle includes a traction battery and a cooling system. The cooling system has a chiller, a radiator, and conduit and valving arranged to form a thermal circuit configured to selectively transport heat via coolant from the traction battery to the radiator. The vehicle also includes a grille shutter assembly having an opening and shutters movable to alter an effective cross-sectional area of the opening. A controller is programed to operate the shutters to change the effective cross-sectional area of the opening to increase or decrease air flow over the radiator based on a temperature of the coolant and an ambient air temperature.

According to another embodiment, a vehicle includes a traction battery, a radiator, a charge port, and a thermal circuit arranged to selectively circulate coolant between the battery and the radiator. A fan is disposed adjacent the radiator. The vehicle also includes a controller programed to run the fan in response to the traction battery receiving charge via the charge port. The duty cycle of the fan is based on a temperature of the coolant and an ambient air temperature.

According to yet another embodiment, a vehicle includes a traction battery, a grille shutter assembly having shutters, and a cooling system. The cooling system has a chiller, a radiator, and conduit and valving arranged to form a thermal circuit configured to selectively transport heat via coolant from the traction battery to the radiator. The vehicle also includes a controller programed to actuate the shutters to alter air flow over the radiator based on a temperature of the coolant and an ambient air temperature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
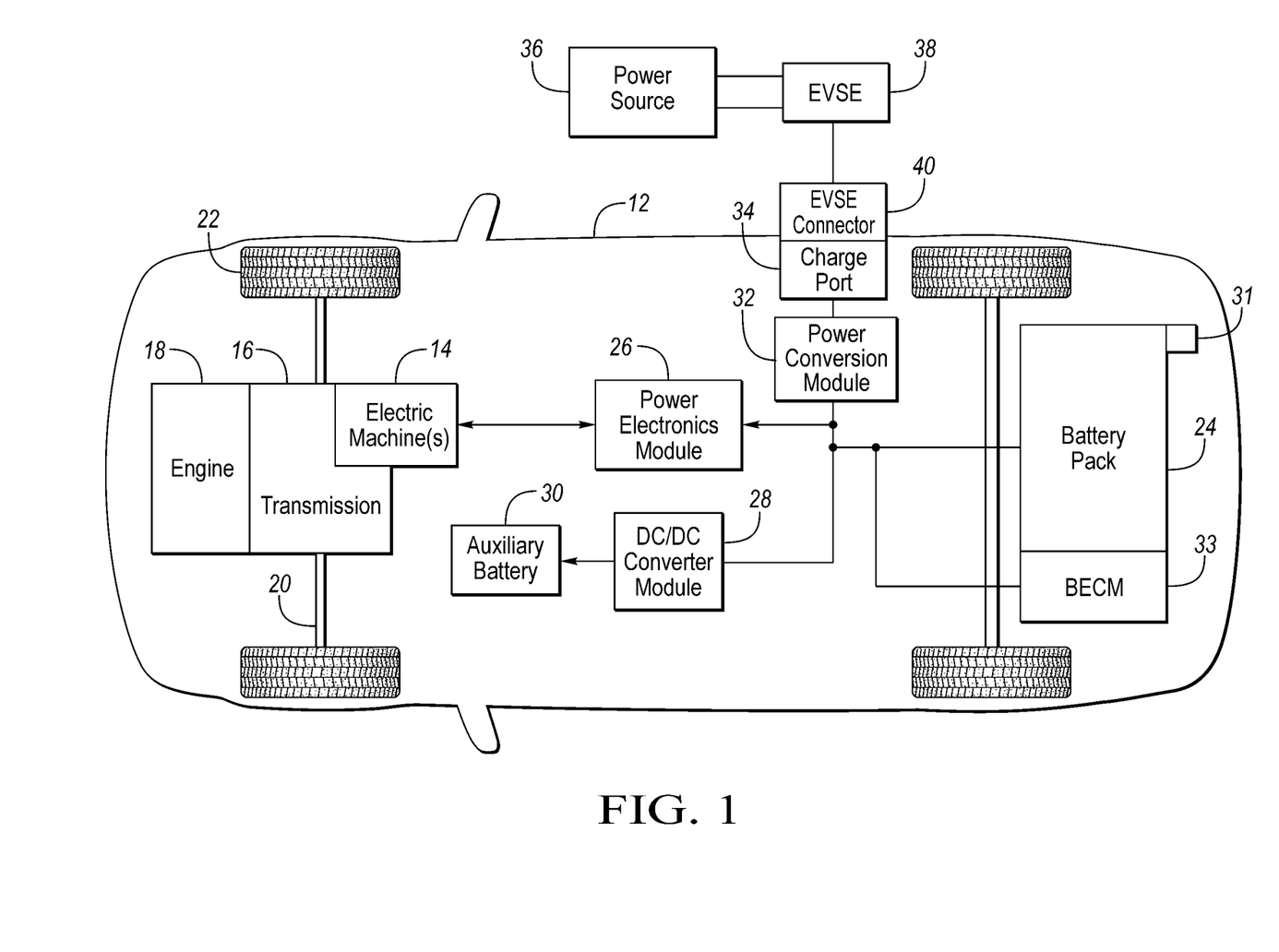
FIG. 1 illustrates a schematic of a hybrid electric vehicle.

FIG. 1 depicts a schematic of an example plug-in hybrid-electric vehicle (PHEV). Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A fraction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 may be an electric power grid. The external power source 36 is electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. In some embodiments, the vehicle may be wirelessly charged via an induction charging system.

The vehicle 12 may have a plurality of different charging modes depending upon the type and power capacity of the EVSE 38. For example, the vehicle 12 may have a slow-charging mode that is used when the EVSE 38 is a 110 volts power source. The vehicle 12 may have another charging mode that is used when the EVSE 38 is a 220 volts power source. The vehicle 12 may also have a fast-charging mode that is used when the power source is a 300 plus volts power source. The EVSE 38 may be capable of preforming fast charge or another charging station may be used. The fast-charging mode may be a DC charging mode. The higher-voltage charging modes allow the vehicle to be charged faster because a higher amount of current is being supplied to the battery cells. Because of the higher current, more heat is produced during the higher voltage charging modes. In some of the charging modes, such as fast charge, the batteries must be actively cooled to prevent overheating.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" may refer to one or more controllers.

Figure 2:
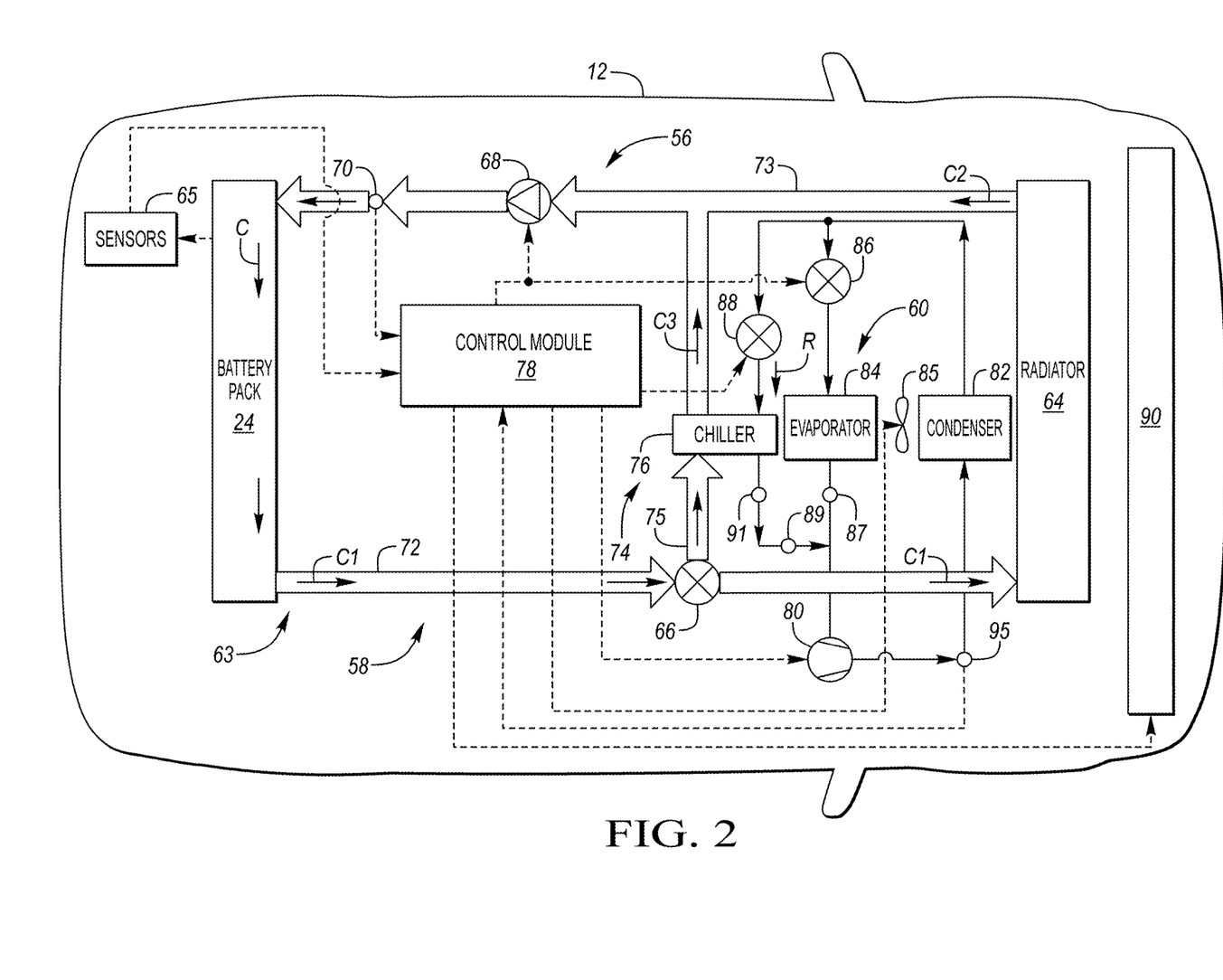
FIG. 2 illustrates a schematic diagram of a thermal management system.

The traction battery 24 and other vehicle component are thermally regulated with one or more thermal management system. Example thermal management systems are shown in the Figures and described below. Referring to FIG. 2, a vehicle 12 includes a thermal management system 56. In FIG. 2, devices and fluidic conduits are shown as solid lines, and electrical connections are shown as dashed lines. The thermal management system 56 can be employed to manage thermal loads generated by various vehicle components, such as the battery assembly 24, powertrain components, and power-electronic components. For example, the thermal management system 56 can selectively circulate coolant to the battery assembly 24 to either cool or heat the battery assembly depending on operating conditions.

The thermal management system 56 may include a controller, or control module 78. While schematically illustrated as a single module in the illustrated embodiment, the control module 78 may be part of a larger control system and may be controlled by various other controllers throughout the vehicle, such as a vehicle system controller (VSC) that includes a powertrain control unit, a transmission control unit, an engine control unit, a BECM, etc. It should be understood that the control module 78 and one or more other controllers can collectively be referred to as "a controller" that controls, such as through a plurality of integrated algorithms, various actuators in response to signals from various sensors to control functions associated with the vehicle, and in this case, with a thermal management system 56. The various controllers that make up the VSC can communicate with one another using a common bus protocol (e.g., CAN).

In one embodiment, the thermal management system 56 includes a coolant subsystem 58 and a refrigerant subsystem 60. The coolant subsystem 58, or coolant loop, circulates coolant C to the battery assembly 24. The coolant C may be a conventional type of coolant mixture, such as water mixed with ethylene glycol. Other coolants could also be used by the thermal management system 56. The coolant subsystem 58 may include a radiator 64, a valve 66, a pump 68, a sensor 70, the battery, and a chiller 76. Additional components may also be employed by the coolant subsystem 58.

In operation, warm coolant C1 may exit an outlet 63 of the battery 24. The warm coolant C1 is circulated to the radiator 64 via line 72. The warm coolant C1 is cooled within the radiator 64 by airflow traveling across the fins to effectuate heat transfer between the airflow and the warm coolant C1. Cool coolant C2 exits the radiator 64 and enters line 73 for recirculation to the pump 68.

The sensor 70 may be positioned near an inlet 61 of the battery pack 24. The sensor 70 is configured to monitor the temperature of the coolant C that is returned to the battery pack 24. In some embodiments, multiple sensors may be used to measure coolant temperature at various locations. The battery pack 24 may also include one more sensors 65. The sensors 65 monitor the temperatures of various battery cells (not shown) of the battery pack 24.

The coolant subsystem 58 includes a bypass line 75 connected between line 72 and line 73. The bypass line 75 allows coolant to bypass the radiator. A valve 66 is used to control the circulation of coolant through the bypass line 75 and the radiator 64. The valve 66 may be a solenoid valve that is electrically controlled by the controller 78. Other types of valves could alternatively be utilized within the coolant subsystem 58.

The bypass line 75 forms a portion of the chiller loop 74. The chiller 76 is disposed on bypass line 75. The chiller 76 exchanges heat with a refrigerant subsystem 60 to provide a chilled coolant C3 during certain conditions. For example, when an ambient air temperature exceeds a predefined threshold, the valve 66 may be actuated to circulate coolant to the chiller 76 rather than the radiator 64. A portion of the warm coolant C1 from the battery pack 24 may enter the chiller loop 74 in bypass line 75 and exchange heat with a refrigerant R of the refrigerant subsystem 60 within the chiller 76 to dissipate heat when the vehicle 12 is in a chiller mode.

The refrigerant subsystem 60, may include a compressor 80, a condenser 82, an evaporator 84, the chiller 76, a first expansion device 86 and a second expansion device 88. The compressor 80 pressurizes and circulates the refrigerant R through the refrigerant subsystem 60. The compressor 80 may be powered by an electrical or non-electrical power source. A pressure sensor 95 may monitor the pressure of the refrigerant R exiting the compressor 80.

Refrigerant R exiting the compressor 80 may be circulated to the condenser 82. The condenser 82 transfers heat to the surrounding environment by condensing the refrigerant R from a vapor to a liquid. A fan 85 may be selectively actuated to circulate an airflow across the condenser 82 to effectuate heat transfer between the refrigerant R and the airflow.

At least a portion of the liquid refrigerant R that exits the condenser 82 may be circulated through the first expansion device 86 and then to the evaporator 84. The first expansion device 86 is adapted to change the pressure of the refrigerant R. In one embodiment, the first expansion device 86 is an electronically controlled expansion valve (EXV). In another embodiment, the first expansion device 86 is a thermal expansion valve (TXV). The liquid refrigerant R is vaporized from liquid to gas, while absorbing heat, within the evaporator 84. The gaseous refrigerant R may then return to the compressor 80. Alternatively, the first expansion device 86 may be closed to bypass the evaporator 84. The refrigerant subsystem may include a pair of temperature sensors 87, 89 and a pressure sensor 91 that are electrically connected to the controller 78. The controller 78 may operate the expansion device 86 based on signals received from these and other sensors.

Another portion of the liquid refrigerant R exiting the condenser 82 (or all of the refrigerant R if the first expansion device 86 is closed) may circulate through the second expansion device 88 and enter the chiller 76. The second expansion device 88, which may also be an EXV or TXV, is adapted to change the pressure of the refrigerant R. The refrigerant R exchanges heat with the warm coolant C1 within the chiller 76 to provide the chilled coolant C3 during the chiller mode. The controller 78 may operate the expansion device 88 based on signals received from sensors 87, 89, 91 and 95.

In one embodiment, the controller 78 can control operation of the coolant subsystem 58 and refrigerant subsystem 60 to achieve desired heating and/or cooling of the battery 24. For example, the control module 78 may control or be in communication with the valve 66, the coolant pump 68, the sensor 70, the sensors 65, the compressor 80, temperature sensors 87 and 89, pressure sensors 91 and 95, the fan 85, grille shutters 90, the first expansion device 86 and the second expansion device 88, among other components.

The vehicle 12 may include a grille shutter assembly 90 disposed behind the front fascia of the vehicle 12 and in front of the radiator 64, the condenser 82, and the fan 85. The grille shutter assembly includes shutters operable to move between an open position and a closed position. The grille shutter assembly 90 is in communication with the controller 78. The controller 78 is programed to send one or more signals to an actuator of the grille shutter assembly 90 to move the shutters to a desired position based on operating conditions.

The aerodynamics of the vehicle 12 can be improved by at least partially closing the shutters when possible. The shutters can also be operated to control airflow over the radiator and the condenser. By controlling the airflow, the temperature of the coolant and/or the battery pack can be increased or decreased as desired.

Figure 3:
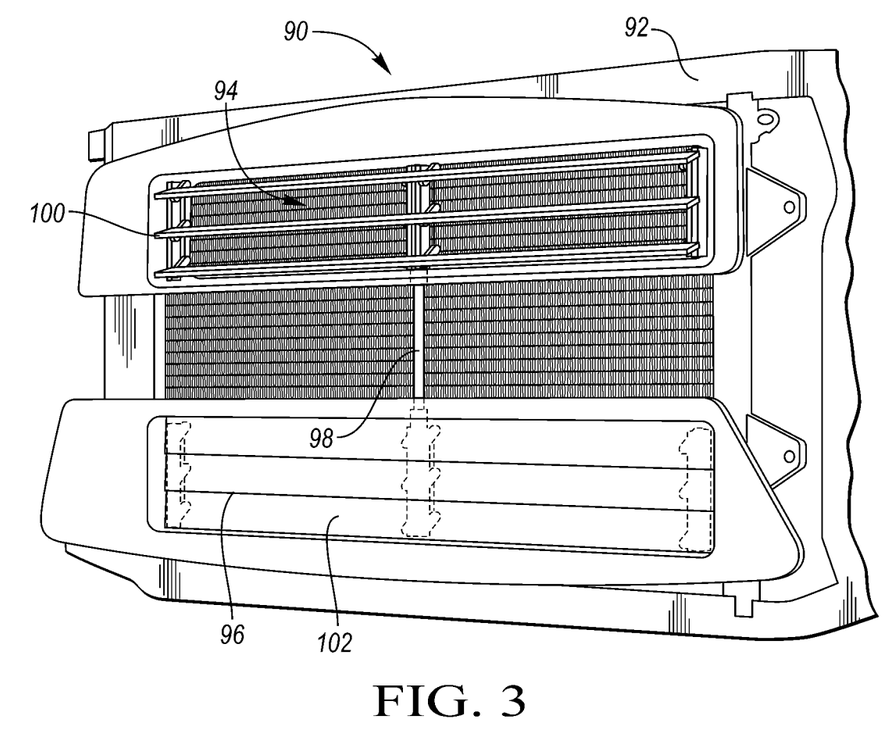
FIG. 3 illustrates a perspective view of a grille-shutter assembly.

Referring to FIG. 3, an example grille shutter assembly 90 is illustrated. The grille shutter assembly 90 includes a housing 92 attached to one or more vehicle body structures behind the front fascia of the vehicle 12. The housing 92 defines at least one opening 94. A plurality of shutters 96 are pivotally attached to the housing 92 and are disposed in one or more of the openings 94. Each of the shutters 96 are movable between an open position, a closed position, and a plurality of intermediate positions via an actuator 98. The actuator 98 may include a motor that is electrically controlled by the controller 78. For illustrative purposes, the upper bank of shutters is shown in the open position and the lower bank of shutters is shown in the closed position. In some embodiments the upper and lower banks of shutter operate dependently and in other embodiments the upper and lower banks operate independently. Each of the shutters 96 also includes a major side 100 and a minor side 102. When in the closed position, each of the shutters 96 are rotated such that the major side 100 faces the airstream to block air from entering through the openings 94. When in the open position, each of the shutters are rotated such that the minor sides 102 face the airstream allowing air to flow through the openings 94. Each of the openings 94 and the shutters cooperate to define an effective cross-sectional area through which air may pass. The size of the effective cross-sectional area can be increased or decreased by moving the shutters.

Figure 4:
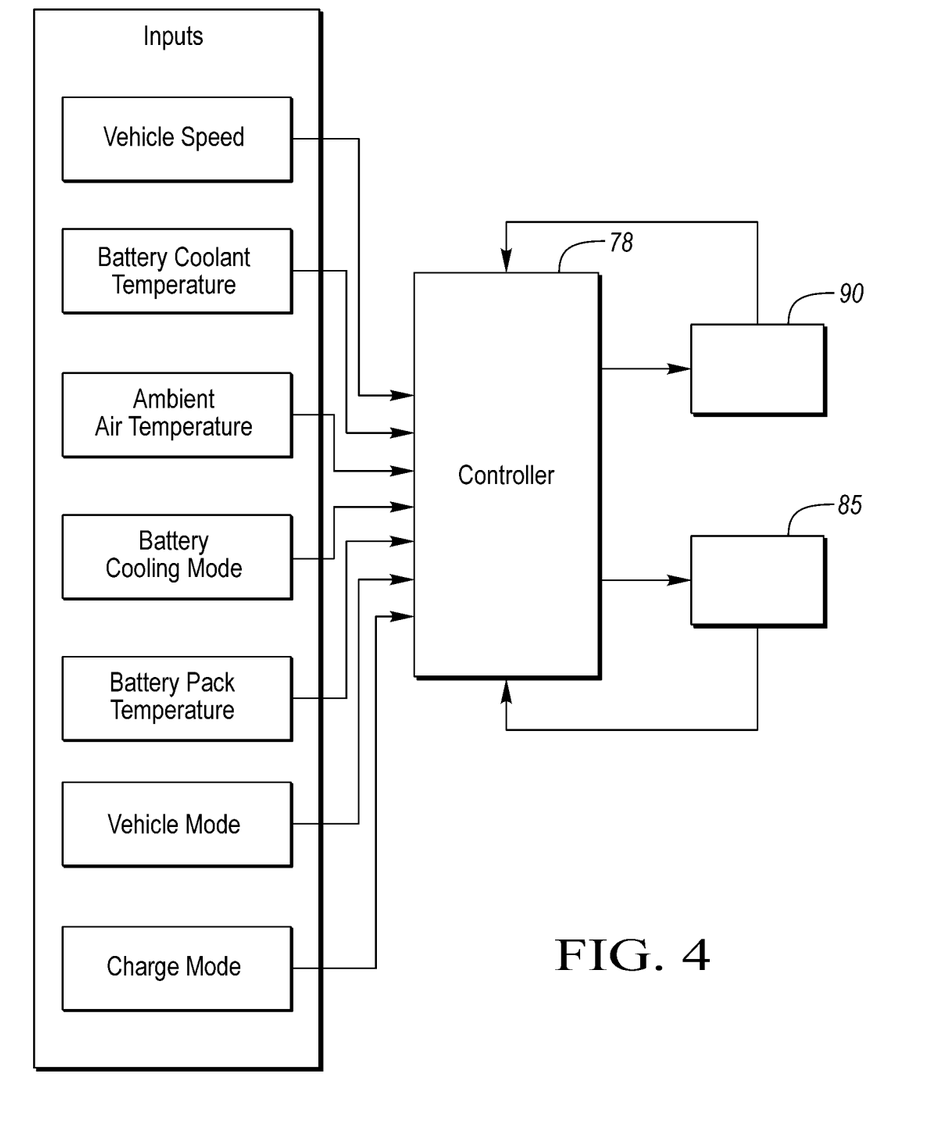
FIG. 4 illustrates an exemplary system diagram of the thermal management system.

Referring to FIG. 4, the controller 78 receives input that is indicative of a present operating condition of vehicle systems and provides output to coordinate their function. Each input may be a signal transmitted directly between the controller and the corresponding vehicle system or indirectly as data over a data bus. For example, the controller 78 may control the thermal management system 56 based on a plurality of inputs. The inputs may include vehicle speed, battery pack temperature, battery coolant temperature, ambient air temperature, battery cooling mode, charge mode, and vehicle mode. Based on these inputs, the controller 78 sends instructions to various components of the thermal management system 56 to effectuate a desired operation of the vehicle. For example, the controller 78 may selectively send signals to operate the grille shutters 90 and/or the fan 85 based on operating conditions of the vehicle 12. The controller 78 may also receive feedback signals from the grille shutters 90 and/or the fan 85.

Referring back to FIG. 2, the thermal management system 56 may operate in a plurality of different operating modes. The system 56 may operate in a battery heating mode or a battery cooling mode. Each of the modes may also include a plurality of different sub-routines or sub modes. In some routines, the battery 24 is cooled by the radiator 64 and in others the battery 24 is cooled by the chiller 76. The fan 85 may be utilized in both of these routines. For example, cooling mode may include may include 6 sub-routines, such as cooling routine 0 to 5. For example, routine 0 is OFF; routine 1 circulates coolant through the chiller loop with the chiller in an inactive state; routine 2 cools the battery 24 using the battery radiator 64 and the grille shutters 90; routine 3 cools the battery using the battery radiator 64, the grille shutters 90 and the fan 85; and routines 4 and 5 cool the battery using the chiller 76 and the refrigerant subsystem 60. The controller 78 may choose between the different modes and routines based on inputs and calculated efficiencies. Cooling the battery pack 24 via the radiator 64 (e.g. routines 2 and 3) may be more energy efficient (i.e. require less power from the battery) than cooling via the chiller 76 (e.g. routines 4-5). Therefore, the controller 78 may choose a radiator cooling routine whenever possible. But, the radiator may have a lower cooling capacity than the chiller and thus, cooling with the radiator may not be possible during certain operating conditions. For example, radiator cooling may not be optimal when the battery pack 24 is producing a high amount of heat or the ambient air temperature exceeds a threshold.

During either radiator or chiller cooling routines, the controller 78 may selectively operate the grille shutter assembly 90 and the fan 85 based on operating conditions. The grille shutter assembly 90 may be actuated to control airflow across the radiator 64 or the condenser 82 and thus control temperature of the battery pack 24. The fan 85 may also be operated to increase or decrease the heat-transfer capacity of the radiator 64 and/or the condenser 82. The fan 85 may have a plurality of different speeds in addition to ON and OFF states. The controller 78 may operate the fan 85 to control temperature of the battery pack 24.

The aerodynamics of the vehicle 12 are improved when the grille shutters 90 are in the closed position. The controller 78 may be programmed to close the grille shutters 90 whenever possible. But, when the grille shutters are closed, the cooling capacity of the radiator 64 is reduced, and the condensing capacity of the condenser 82 is reduced. Thus, the grille shutters 90 may need to be at least partially opened to prevent overheating of the battery pack 24. The fan 85 may be operated in coordination with the grille shutters to offset reduced airflow through the grille shutters when the shutter opening is reduced to increase vehicle aerodynamics.

Figure 5A:
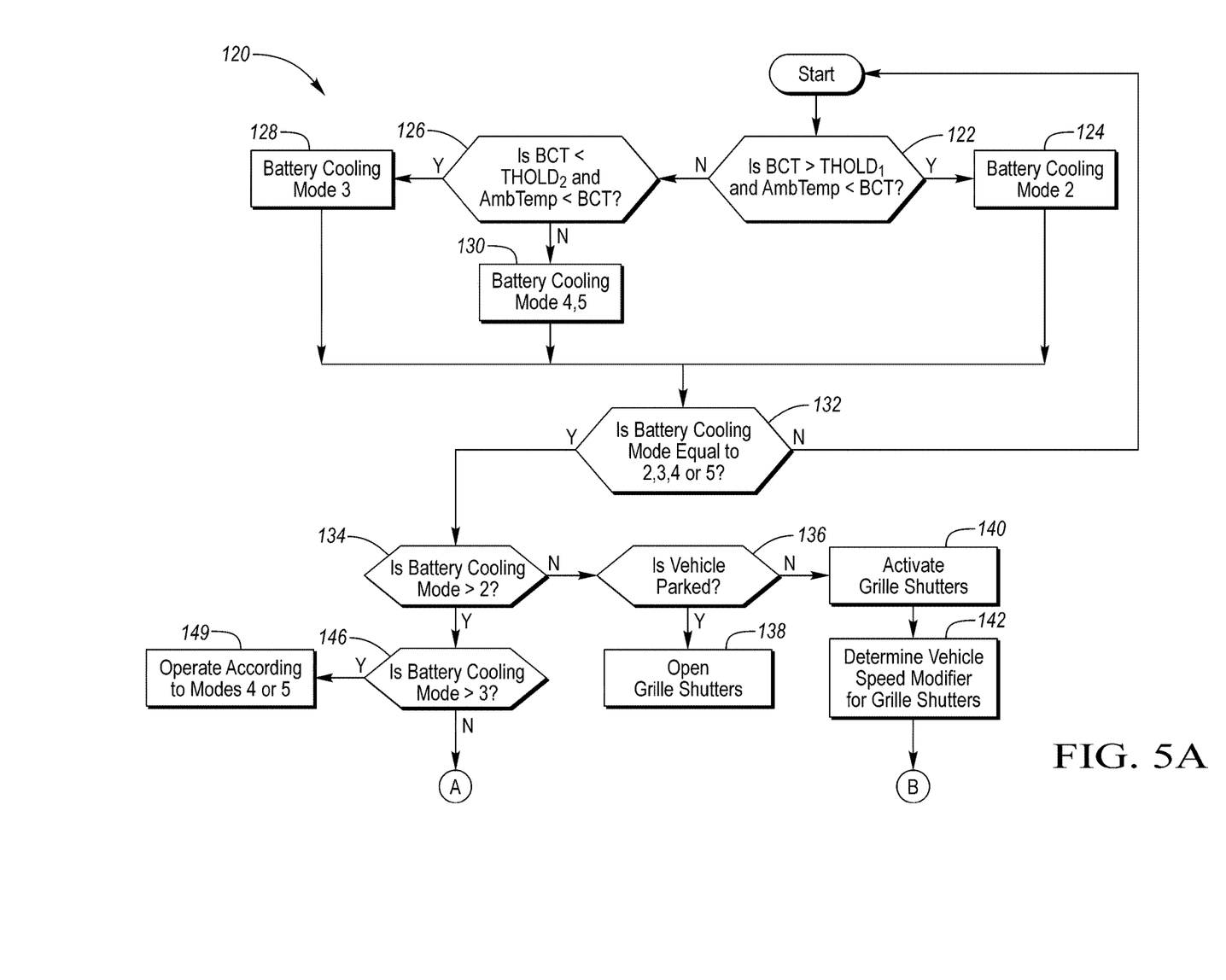
FIGS. 5A and 5B illustrate a flow chart for operating the battery thermal management system.
Figure 5B:
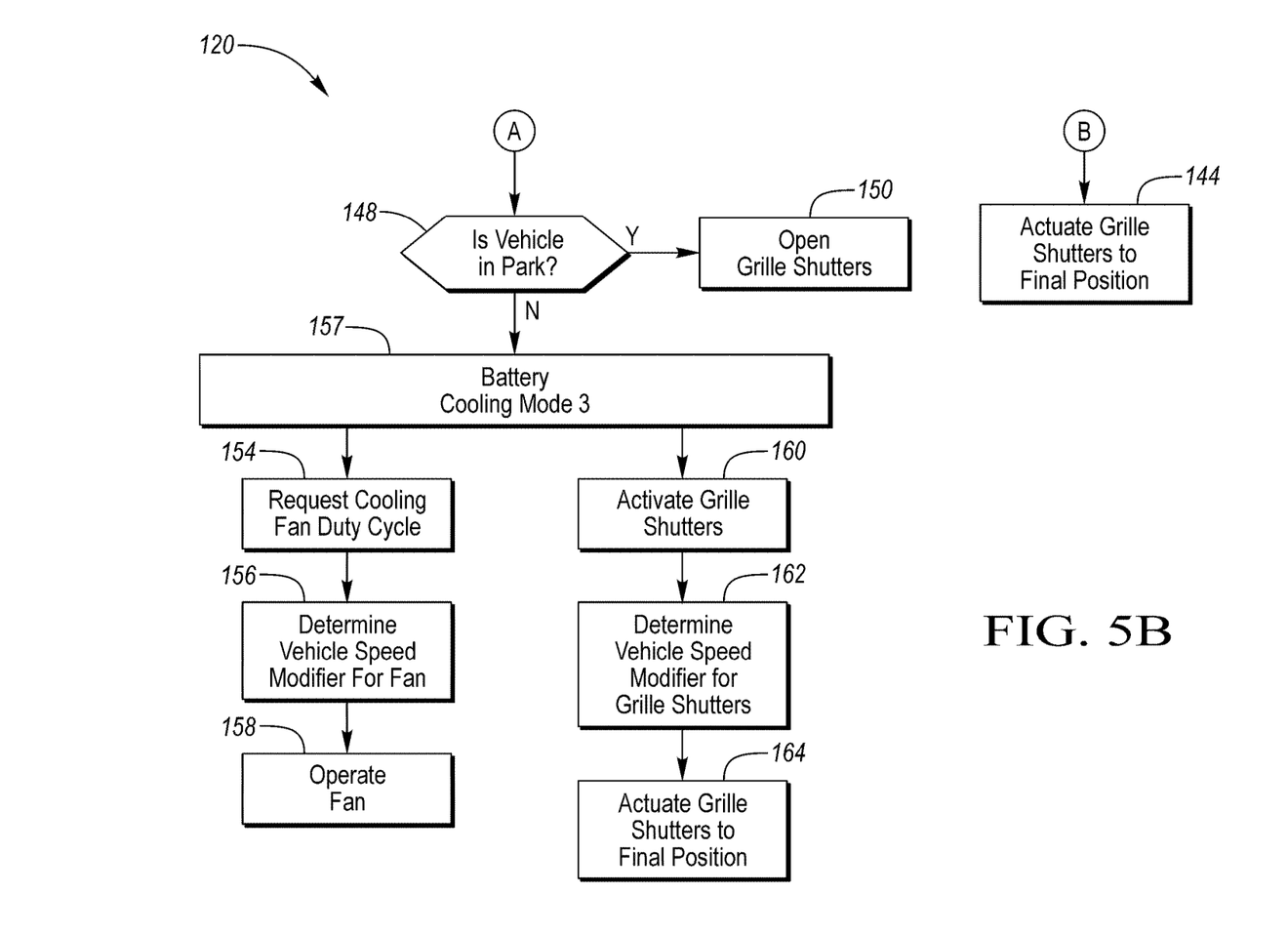

FIGS. 5A and 5B illustrate an example control strategy 120 for operating the thermal management system of the traction battery 24. The controller 78 is programmed with one or more algorithms adapted to execute the control strategy 120. At operation 122, the controller determines if the temperature of the battery 24 is above a threshold ($THOLD_1$) and if the ambient-air temperature (AmbTemp) is below the temperature of the battery 24. The temperature of the battery may be based on either the battery coolant temperature (e.g. sensor 70), and/or the temperature of the cells in the battery pack (e.g. sensors 65). If yes, control passes to operation 124 and cooling routine 2 is chosen. If no, control passes to operation 126. At operation 126 the controller determines if the battery temperature is below a second threshold ($THOLD_2$) and if the AmbTemp is below the battery temperature. If yes, control passes to operation 128 and cooling routine 3 is chosen. If no, control passes to operation 130 and cooling routine 4 or 5 is chosen. At operation 132 the controller determines if the system is in operating mode 2, 3, 4, or 5. If not, the wake-up reason is false and control loops back to the start. If yes, control passes to operation 134 and the controller determines if the system is in a cooling routine greater than 2. If no, control passes to operation 136 and the controller determines if the vehicle is parked, which may be determined by sensing if the vehicle is charging enabled, if the vehicle speed is zero, and/or if the transmission is in park. If yes, control passes to operation 138 and the grille shutters are fully opened and the fan 85 is turned off. If no, control passes to operation 140.

At operation 140 the grille shutters are activated based on a function of AmbTemp and battery temperature, which may be based on the battery coolant temperature or the battery pack temperature. For example, the opening of the grille shutter assembly 90 (i.e. the effective cross-sectional area) may be greater when the battery or the ambient air temperature is hotter, and may be smaller when the ambient air temperature or battery is cooler. At operation 142 the controller determines if the grille shutter openings can be modified to increase aerodynamics of the vehicle. The algorithm includes a vehicle-speed modifier that is based on a function of the vehicle speed and the required grille openings to maintain proper cooling of the battery. At operation 144 the controller commands the grille shutters to a desired position based on the speed modifier and the position calculated in operation 140.

If at operation 134 the cooling routine is greater than 2, control passes to operation 146, where the controller determines if the system is in a cooling routine greater than 3. If the system is in a cooling routine greater than 3, control passes to operation 149 and the system operates according to one or more of the chiller cooling routines. If no, control passes to operation 148 and the controller determines if the vehicle is parked. If the vehicle is parked, the grille shutters are sent to a fully open position and the fan 85 is operated based on a function of AmbTemp and battery temperature at operation 150.

If the controller at operation 148 determines that the car is not parked, control passes to operation 152, and the system operates according to cooling routine 3. In cooling routine 3, the fan 85 and the grille shutters cooperate to control the temperature of the battery 24. The controller may periodically modify the duty cycle of the fan 85 and the position of the grille shutters simultaneously. But, for explanation purposes, the fan duty cycle will be discussed first and the grille shutter position will be discussed second. The calibration of the grille shutters, cooling fans, and respective vehicle speed modifiers may be determined during vehicle testing and stored in one or more lookup tables. Based on the lookup tables, the controller can optimize the system to provide battery cooling in the most efficient way. For example, for a given range of vehicle speeds, the fan speed may be reduced and the effective cross-sectional area of the grille shutters increased to more efficiently provide battery cooling. For another range of speeds, the controller may reduce the effective cross-sectional area of the grille shutter (to reduce vehicle drag) and increase the speed of the fan to offset the reduce air volume through the front grille.

At operation 154 a duty cycle of the fan 85 is determined based on the battery temperature and the AmbTemp. At operation 156 a fan modifier is determined based on a function of the vehicle speed and the duty cycle determined in operation 154. At operation 158 the controller commands the fan to a desired speed based on the duty cycle determined in operation 154 and on the modifier from operation 156.

At operation 168 the grille shutter position is determined based on a function of the AmbTemp and the battery temperature. At operation 162 the controller determines if the grille shutter openings can be modified to increase aerodynamics of the vehicle, for example by decreasing the effective cross-sectional area of the openings. The algorithm includes a vehicle-speed modifier based on a function of the vehicle speed and the required grille openings (determined in operation 160) to maintain adequate cooling of the battery. At operation 164 the controller commands the grille shutters to a desired position based on the speed modifier and the position calculated in operation 162. The control logic 120 will be periodically cycled to determine the appropriate cooling routine as well as the appropriate fan speed and grille shutter position based on operating conditions of the vehicle. For example, the control logic 120 may be performed every 10 to 500 milliseconds.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   a grill shutter assembly including an opening and shutters movable to alter an effective cross-sectional area of the opening;
   a battery thermal management system including
      a refrigerant subsystem having a compressor, a condenser, and a chiller,
      a coolant subsystem having a pump, a radiator, and conduit arranged to carry coolant between the traction battery and the radiator to cool the traction battery, the coolant subsystem further having a radiator-bypass conduit in fluid communication with the chiller and a valve configured to selectively route coolant to the radiator or the chiller depending upon a position of the valve, and
      a fan adjacent to the radiator and the condenser and configured to circulate air over the radiator and the condenser; and
   a controller configured to,
      in response to a temperature of the traction battery being greater than a first threshold and an ambient air temperature being less than the temperature of the traction battery, (i) actuate the valve to route coolant to the radiator and (ii) operate the shutters to change the effective cross-sectional area of the opening to increase or decrease air flow over the radiator based on a temperature of the coolant, the ambient air temperature, and a speed of the vehicle,
      in response to the temperature of the traction battery being greater than the first threshold and less than a second threshold, and the ambient air temperature being less than the temperature of the traction battery, (i) actuate the valve to route coolant to the radiator, (ii) operate the shutters to change the effective cross-sectional area of the opening to increase or decrease air flow over the radiator based on a temperature of the coolant, the ambient air temperature, and a speed of the vehicle, and (iii) run the fan at a duty cycle that is based on a temperature of the coolant and the ambient air temperature, and
      in response to the temperature of the traction battery being above the second threshold or the ambient air temperature being above the temperature of the traction battery, actuate the valve to route coolant to the chiller.

2. The vehicle of claim 1 wherein the duty cycle of the fan increases in response to the temperature of the coolant increasing.

3. The vehicle of claim 1 further comprising a charge port, wherein the controller is further programed to run the fan in response to the traction battery receiving charge via the charge port.

4. The vehicle of claim 1 wherein the controller is further programmed, in response to the temperature of the battery being greater than the first threshold and the vehicle being in parked, actuate the shutters to a fully opened position.

5. The vehicle of claim 1 wherein the controller is further programmed to de-energize the fan in response to the temperature of the traction battery being less than a third threshold and an ambient air temperature being less than the temperature of the traction battery.

6. A vehicle comprising:
   a traction battery;
   a grill shutter assembly;
   a battery thermal management system including
      a refrigerant subsystem having a chiller and a condenser,
      a coolant subsystem having a radiator and conduit arranged to carry coolant between the traction battery, the radiator, and the chiller,
      a valve configured to selectively route coolant to the radiator or the chiller, and
      a fan configured to circulate air through the radiator and the condenser; and
   a controller programmed to,
      in response to a temperature of the traction battery being between first and second thresholds, and an ambient air temperature being less than the temperature of the traction battery, (i) actuate the valve to route coolant to the radiator, (ii) open the grill shutters, and (iii) run the fan at a duty cycle that is based on a temperature of the coolant and the ambient air temperature, and
      in response to the temperature of the traction battery being greater than the second threshold or the ambient air temperature being greater than the temperature of the traction battery, actuate the valve to route coolant to the chiller.

7. The vehicle of claim 6 wherein the controller is further programmed to, in response to a temperature of the traction battery being less than the first threshold and an ambient air temperature being below the temperature of the traction battery, (i) actuate the valve to route coolant to the radiator and (ii) operate the grill shutter assembly to increase or decrease air flow over the radiator based on a temperature of the coolant, the ambient air temperature, and a speed of the vehicle, and (iii) de-energize the fan.

8. The vehicle of claim 6 wherein the grill shutter assembly further includes a first bank of shutters and a second bank of shutters, wherein the first and second banks are independently movable relative to each other.

9. The vehicle of claim 6 wherein the controller is further programmed to operate the grill shutter assembly to change an effective cross-sectional area of an opening of the grill shutter assembly to increase or decrease air flow though the radiator based on a temperature of the coolant, the ambient air temperature, and a speed of the vehicle.

10. The vehicle of claim 6 wherein the controller is further programmed, in response to the temperature of the battery being greater than the first threshold and the vehicle being in parked, actuate the grill shutter assembly to a fully opened position.

11. A vehicle comprising:
    a controller programmed to,
        in response to a temperature of a traction battery being between first and second thresholds, and an ambient air temperature being less than a temperature of the traction battery, (i) actuate a valve to route coolant to a radiator, (ii) increase an opening of a grill shutter assembly, and (iii) run a fan at a duty cycle that is based on a temperature of coolant circulating through the battery and the ambient air temperature, and
        in response to a temperature of the traction battery being greater than a second threshold or the ambient air temperature being greater than the temperature of the traction battery, actuate the valve to route coolant to a chiller of a refrigerant system.

\* \* \* \* \*